United States Patent [19]
Goodwin

[11] 3,957,286
[45] May 18, 1976

[54] SWAY CONTROL ADAPTOR

[75] Inventor: Max E. Goodwin, Lodi, Calif.

[73] Assignee: Valley Tow-Rite, Lodi, Calif.

[22] Filed: Feb. 28, 1975

[21] Appl. No.: 554,297

[52] U.S. Cl. ............................................ 280/446 B
[51] Int. Cl.² ......................................... B60D 1/00
[58] Field of Search ................................. 280/446 B

[56] References Cited
UNITED STATES PATENTS
3,294,421  12/1966  Mathisen ........................ 280/446 B Primary Examiner—M. H. Wood, Jr.
Assistant Examiner—John A. Pekar
Attorney, Agent, or Firm—Townsend and Townsend

[57] ABSTRACT

A sway control adaptor for mounting one end of a sway control assembly to a towing vehicle adjacent the trailer hitch is disclosed. The adaptor includes a upper elongate member having one part which overlies a portion of the trailer hitch and a second part extending transversely from the first part. A lower elongate member underlies that portion of the trailer hitch, and is bolted to the upper elongate member to mount the members to the hitch. A sway control hitch ball is mounted to the free end of the second part of the upper elongate member for attachment of the leading end of the sway control device to the towing vehicle on one side of the hitch.

6 Claims, 3 Drawing Figures

U.S. Patent   May 18, 1976   3,957,286
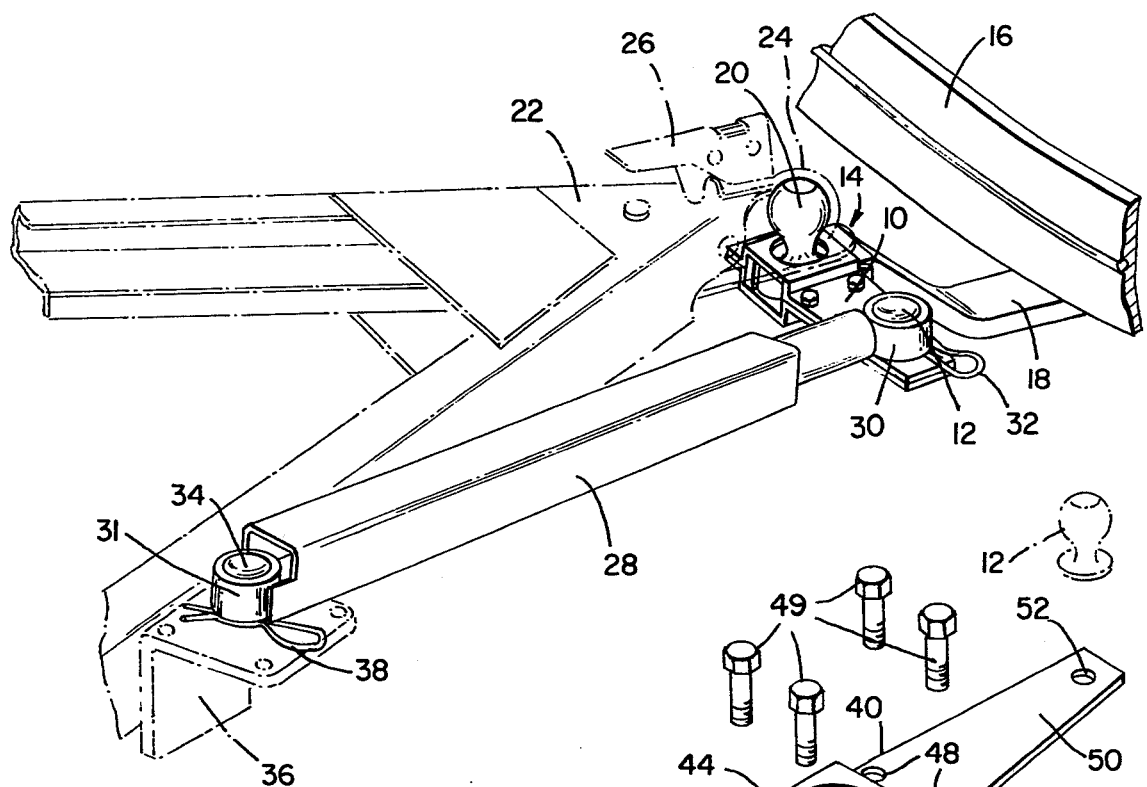
FIG_1
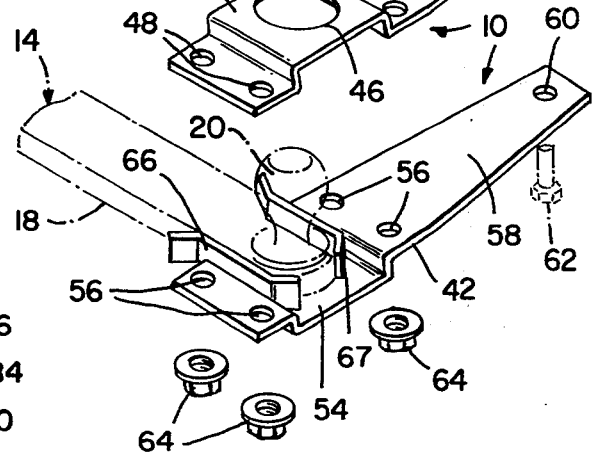
FIG_2
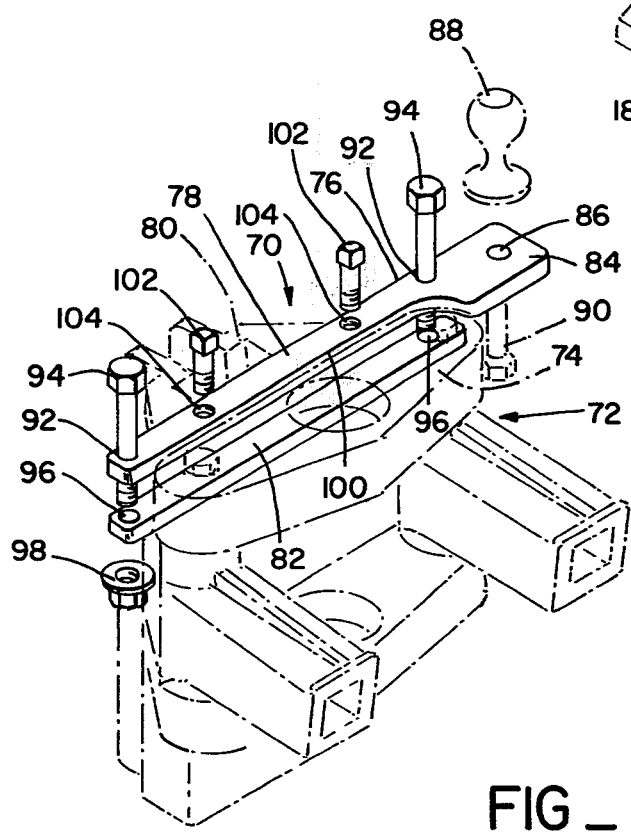
FIG_3

3,957,286

SWAY CONTROL ADAPTOR

BACKGROUND OF THE INVENTION

The present invention provides a sway control adaptor for mounting one end of a sway control assembly to a towing vehicle adjacent the trailer hitch, and in particular to such an adaptor which can be readily mounted to an existing trailer hitch.

The problem of excessive sway of a trailer with respect to the towing vehicle has long been recognized as a safety hazard when trailers are being towed, especially around curves and in the presence of high wind. Sway control assemblies or dampers, consisting basically of a linear friction slide interconnecting the towing vehicle and the trailer, have been recently developed and substantially minimize the problem of excessive trailer swaying when the control assembly is installed. Such devices usually have female hitch members at each end adapted to attach to complementary hitch balls on the trailer and the towing vehicle respectively. The sway control hitch ball on the towing vehicle is located to one side of the trailer hitch and the sway control hitch ball on the trailer is located alongside the trailer tongue and the sway control device extends between the two hitch balls.

The usual practice in mounting the sway control hitch ball to the towing vehicle is to weld a bar to the existing trailer hitch so that it extends transversely from the hitch, and to mount the sway control hitch ball to the free end of the transverse bar. This type of mounting assembly is adequate when a new trailer hitch incorporating the sway control hitch ball is constructed, but is relatively difficult to install for trailer hitches already mounted on a vehicle. Furthermore, the transverse bar presents an obstruction at the rear end of the towing vehicle which may be undesirable when the vehicle is used without a trailer. As a result, sway control assemblies are often not used even though their advantages in controlling the sway of the trailer are well known, and a trailer can be towed much more safely when a sway control assembly is installed.

SUMMARY OF THE INVENTION

The present invention provides a sway control adaptor for mounting one end of a sway control assembly to a towing vehicle adjacent the trailer hitch. The adaptor includes a upper elongate member having one part which overlies a portion of the trailer hitch and a second part extending transversely from the first part. A lower elongate member underlies that portion of the trailer hitch, and is bolted to the upper elongate member to mount the members to the hitch. A sway control hitch ball is mounted to the free end of the second part of the upper elongate member for attachment of the leading end of the sway control device to the towing vehicle on one side of the hitch.

One embodiment of the present invention is designed for trailer hitches which comprise a rearwardly extending hitch bar having a hitch ball for the trailer tongue mounted to its trailing end. In this embodiment, the basic configurations of the upper and lower elongate members are mirror images of each other, and the sway control hitch ball is mounted to the transverse extensions of the two members. In addition, the lower member includes one or more flanges which at least partially circumscribe the trailing end of the hitch bar to prevent movement of the sway control adaptor with respect to the trailer hitch.

A second embodiment of the present invention is adapted for use with trailer hitches which have a raised hitch ball pad. In this embodiment, the first section of the upper elongate member is curved to fit around the hitch ball pad, and a pair of set screws are engageable with the upper elongate member and adapted to intersect the trailer hitch to prevent sliding of the sway control adaptor.

The principal advantage of the present invention is that it can easily be mounted to existing trailer hitches. The adaptor is merely bolted to the trailer hitch and can easily be attached while the trailer hitch is on the car so that the sway control adaptors of the present invention can readily be used with existing trailer hitches. Also, the sway control adaptor can be removed from the towing vehicle when it is not needed by simply unbolting the upper and lower members so that the adaptor does not present an unwanted obstruction at the rear of the vehicle. The sway control adaptors of the present invention greatly increase the ease with which sway control assemblies can be installed and thus encourage their use, greatly reducing the safety hazards of towing a trailer by minimizing trailer sway.

The novel features which are believed to be characteristic of the invention, both as to organization and method of operation, together with further objects and advantages thereof will be better understood from the following description considered in connection with the accompanying drawings in which two preferred embodiments of the present invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the use of the first embodiment of the present invention in mounting a sway control assembly to a towing vehicle and trailer;

FIG. 2 is an exploded view of the first embodiment of the sway control adaptor of the present invention;

FIG. 3 is an exploded view of the second embodiment of the sway control adaptor of the present invention.

DESCRIPTION OF THE PREFERRED EMBODIMENTS

The use of the first embodiment 10 of the present invention in mounting a sway control hitch ball 12 adjacent an existing trailer hitch 14 is illustrated by way of reference to FIG. 1. In this embodiment, towing vehicle 16 is provided with a type of trailer hitch 14 which has a rearwardly extending hitch bar 18 and a hitch ball 20 at the trailing end of the bar. The trailer tongue illustrated in phantom at 22 has a female connecting element 24 at the leading end thereof adapted to mate with and connect to hitch ball 20. Female connecting element 24 is secured to hitch ball 20 by locking mechanism 26.

A sway control assembly 28 is provided having female connector elements 30, 31 at its opposite ends. Female connector element 30 at the leading end of sway control assembly 28 engages with sway control hitch ball 12, and is secured thereto by pin 32. Similarly, female connector element 31 at the trailing end of sway control assembly 28 is connected to a hitch ball 34 attached to the side of trailer tongue 22 by flange 36, and is secured thereto with pin 38. Thus, sway control assembly 28 interconnects towing vehicle 16 and trailer tongue 22 to provide a damper for swaying motion which may be induced on the trailer. Damping the swaying motion prevents excessive swaying of the trailer which otherwise could occur in high winds and during cornering. Such excessive swaying can result in the trailer becoming disconnected from the towing vehicle or can cause loss of control of the towing vehicle.

The first embodiment 10 of the sway control adaptor is more fully illustrated by way of reference to the exploded view of FIG. 2. Adaptor 10 includes an upper elongate member 40 and a lower elongate member 42. Upper elongate member 40 has a first planar section 44 adapted to overlie the trailing end of hitch bar 18. Section 44 has an aperture 46 adapted to fit over hitch ball 20, and a plurality of apertures 48 to allow for passage of bolts 49 therethrough. Upper member 40 also includes a second section 50 which extends transversely from first section 44. Second section 50 has a vertically disposed aperture 52 so that a sway control hitch ball 12 can be mounted thereto.

The exterior configuration of lower member 42 is basically a mirror image of upper member 40. Lower member 42 has a planar portion 54 which underlies the trailing end of hitch bar 18 and has a plurality of apertures 56 corresponding to apertures 48 in upper member 40. Lower member 42 also includes a section 58 extending transversely from first section 54. Section 58 has a vertically disposed aperture 60 at the free end thereof corresponding with aperture 52 in upper member 40. A bolt 62 is adapted to pass upwardly through aperture 60 and 52 to engage sway control hitch ball 12 and mount it to sway control adapter 10.

Upper and lower members 40, 42 of sway control adaptor 10 are mounted to the trailing end of hitch bar 18 by bolts 49, which pass through apertures 48, 56 in the upper and lower members and engage nuts 64. The trailing end of hitch bar 18 is thus compressed between upper and lower members 40, 42. To further insure that sway control adaptor 10 does not move with respect to trailer hitch 14, a pair of flanges 66, 67 are fixed to the upper surface of lower member 42 and partially circumscribe the trailing end of the hitch bar so that adaptor 10 cannot slide forwardly on the hitch bar.

The second embodiment 70 of the sway control adaptor of the present invention is illustrated by way of reference to FIG. 3. Sway control adaptor 70 is adapted for use with a type of trailer hitch 72 which has a raised hitch ball platform 74. Platform 74 is raised relative to the portion 80 of the hitch mounted to the towing vehicle. Adaptor 70 includes an upper elongate member 76 having a first planar section 78 which overlies a portion 80 of hitch 72, and a lower member 82 which underlies portion 80 of the hitch. Upper member 76 also includes a second section 84 extending transversely from first section 78. Second section 84 has a vertically disposed aperture 86 which allows for the mounting of a sway control hitch ball 88 thereto. Sway control hitch ball 88 is mounted to the second section 84 of upper member 76 by bolt 90 which passes upwardly through aperture 86 and engages the hitch ball.

Upper member 76 of adaptor 70 has a pair of apertures 92 which allow bolts 94 to pass downwardly therethrough. Lower member 82 has a corresponding pair of apertures 96 adapted to receive bolts 94 for connection of the bolts with nuts 98. Bolts 94 and nuts 98 compress portion 80 of trailer hitch 72 between upper and lower members 78, 82 to fix adaptor 70 to the hitch. In addition, the first section 78 of upper member 76 has a curved portion 100 which fits over portion 80 and around the front edge of raised hitch ball portion 74 of hitch 72 so that adaptor 70 cannot slide rearwardly. Set screws 102 are engageable with threaded apertures 104 in upper member 78 and passed downwardly therethrough to engage hitch 72 to prevent sliding of adaptor 70 in the forward direction. Thus, adaptor 70 is rigidly attached to hitch 72, but can easily be demounted therefrom and remounted when desired.

While two preferred embodiments of the present invention have been illustrated herein, it is apparent that modifications and adaptations of those embodiments may occur to those skilled in the art. For example, other embodiments could be devised to accommodate different types of trailer hitches. However, it is to be expressly understood that such modifications and adaptations are within the spirit and scope of the present invention, as set forth in the following claims.

What I claim as new is:

1. Apparatus for mounting one end of a sway control assembly to a towing vehicle adjacent the trailer hitch, said apparatus comprising:
    an upper elongate member having a first section adapted to overlie a portion of the trailer hitch and a second section extending transversely from the first section, said second section including a vertically disposed aperture for mounting a sway control hitch ball thereto;
    a lower elongate member adapted to underlie said portion of the trailer hitch, said lower elongate member including flange means adapted to at least partially circumscribe said portion of the trailer hitch to restrict movement of the upper and lower members with respect to said hitch; and
    means for interconnecting the first section of the upper elongate member with the lower elongate member to compress said portion of the trailer hitch therebetween to mount the members to said hitch.

2. Apparatus as recited in claim 1 wherein the first section of the upper elongate member and the second elongate member include a plurality of corresponding apertures, and wherein the connecting means comprises a plurality of bolts adapted to pass through the corresponding apertures to interconnect the upper and lower members.

3. Apparatus for mounting one end of a sway control assembly to a towing vehicle adjacent the trailer hitch, said apparatus comprising:
    an upper elongate member having a first section adapted to overlie a portion of the trailer hitch and a second section extending transversely from the first section, said second section including a vertically disposed aperture for mounting a sway control hitch ball thereto;
    a plurality of set screws engageable with the first elongate member and adapted to intersect said portion of the trailer hitch to prevent sliding of said upper member with respect to the hitch;
    a lower elongate member adapted to underlie said portion of the trailer hitch; and
    means for interconnecting the first section of the upper elongate member with the lower elongate member to compress said portion of the trailer hitch therebetween to mount the members to said hitch.

4. Apparatus for mounting one end of a sway control assembly to a towing vehicle adjacent the trailer hitch, said apparatus comprising:
an upper elongate member having a first section adapted to overlie a portion of the trailer hitch having a raised ball pad, the first section of the upper elongate member having a curved portion adapted to partially circumscribe said raised ball pad, and a second section extending transversely from the first section, said second section including a vertically disposed aperture for mounting a sway control hitch ball thereto;
a lower elongate member adapted to underlie said portion of the trailer hitch; and
means for interconnecting the first section of the upper elongate member with the lower elongate member to compress said portion of the trailer hitch therebetween to mount the members to said hitch.

5. Apparatus for mounting one end of a sway control assembly to a towing vehicle adjacent the trailer hitch wherein the trailer hitch includes a rearwardly projecting hitch bar and a hitch ball mounted to the trailing end of said hitch bar, said apparatus comprising:
an upper elongate member having a first section adapted to overlie a portion of the trailer hitch and having an aperture circumscribing the hitch ball, and a second section extending transversely from the first section, said second section including a vertically disposed aperture for mounting a sway control hitch ball thereto;
a lower elongate member having a first section adapted to underlie said portion of the trailer hitch and a second section extending transversely from the first section and corresponding to the second section of the upper elongate member, said second section of said lower elongate member having a vertically disposed aperture in registry with the vertically disposed aperture in the upper elongate member for mounting the sway control hitch ball to said upper and lower elongate members;
flange means mounted to the upper surface of the first portion of the lower elongate member and adapted to at least partially circumscribe said portion of the trailer hitch; and
means for interconnecting the first sections of the upper and lower elongate members to compress said portion of the trailer hitch therebetween to mount the members to said hitch.

6. Apparatus for mounting one end of a sway control assembly to a towing vehicle having a trailer hitch provided with a raised ball pad, said apparatus comprising:
an upper elongate member having a first section adapted to overlie a portion of the trailer hitch adjacent the raised ball pad and having a curved portion adapted to partially circumscribe said raised ball pad, and a second section extending transversely from the first section, said second section including a vertically disposed aperture for mounting a sway control hitch ball thereto;
a lower elongate member adapted to underlie said portion of the trailer hitch;
a pair of set screws engageable with the first elongate member and adapted to intersect said portion of the trailer hitch to prevent sliding of said upper member with respect to the hitch; and
means for interconnecting the first portion of the upper elongate member with the second elongate member to compress said portion of the trailer hitch therebetween to mount the members to said hitch.

* * * * *